United States Patent
Kolhatkar et al.

(10) Patent No.: US 9,882,424 B2
(45) Date of Patent: Jan. 30, 2018

(54) REDUNDANT UNINTERRUPTIBLE POWER SUPPLY SYSTEMS

(71) Applicant: General Electric Company, Schenectady, NY (US)

(72) Inventors: Yashomani Kolhatkar, Bangalore (IN); Pradeep Vijayan, Bangalore (IN); Silvio Colombi, Riazzino (CH); Rajendra Naik, Bangalore (IN); Viswanathan Kanakasabai, Bangalore (IN)

(73) Assignee: General Electric Company, Schenectady, NY (US)

( * ) Notice: Subject to any disclaimer, the term of this patent is extended or adjusted under 35 U.S.C. 154(b) by 767 days.

(21) Appl. No.: 14/186,159

(22) Filed: Feb. 21, 2014

(65) Prior Publication Data

US 2015/0244210 A1 Aug. 27, 2015
US 2017/0155278 A9 Jun. 1, 2017

(51) Int. Cl.
*H02J 9/06* (2006.01)
*H02M 5/42* (2006.01)

(52) U.S. Cl.
CPC .............. *H02J 9/062* (2013.01); *H02M 5/42* (2013.01); *H02J 2009/068* (2013.01)

(58) Field of Classification Search
CPC .......... G06F 1/26; G06F 1/30; Y10T 307/615; Y10T 307/62; Y10T 307/625; H02J 9/04; H02J 9/06; H02J 9/061; H02J 9/062; H02J 3/04; H02J 3/08
USPC .................................... 307/23, 64, 65, 66, 82
See application file for complete search history.

(56) References Cited

U.S. PATENT DOCUMENTS

| 5,473,528 | A  | 12/1995 | Hirata et al. |
|-----------|----|---------|---------------|
| 6,121,695 | A  | 9/2000  | Loh |
| 6,191,500 | B1 | 2/2001  | Toy |
| 6,803,679 | B1 | 10/2004 | Luo et al. |
| 7,400,066 | B2 | 7/2008  | Tassitino, Jr. et al. |
| 7,425,779 | B2 | 9/2008  | Luo et al. |
| 7,446,433 | B2 | 11/2008 | Masciarelli et al. |

(Continued)

FOREIGN PATENT DOCUMENTS

| CN | 202333831 U | 7/2012 |
|----|-------------|--------|
| CN | 202444318 U | 9/2012 |

(Continued)

OTHER PUBLICATIONS

Johnson et al., "An Industrial Power Distribution System Featuring UPS Properties", 24th Annual IEEE Power Electronics Specialists Conference, pp. 759-765, Jun. 1993.

(Continued)

*Primary Examiner* — Thienvu Tran
*Assistant Examiner* — David M Stables
(74) *Attorney, Agent, or Firm* — General Electric Company (57) ABSTRACT

A system is provided. The system includes a plurality of uninterruptible power supplies (UPSs), a ring bus, at least one load electrically coupled to the plurality of UPSs and the ring bus, and a controller communicatively coupled to the plurality of UPSs. The controller is configured to calculate a phase angle for each UPS of the plurality of UPSs, wherein the phase angle is calculated relative to a common reference angle, and control operation of each UPS based on the respective calculated phase angles.

17 Claims, 8 Drawing Sheets

(56) References Cited

U.S. PATENT DOCUMENTS

| | | | |
|---|---|---|---|
| 7,456,520 | B2 | 11/2008 | Colombi et al. |
| 7,459,803 | B2 | 12/2008 | Mosman |
| 7,566,988 | B2 | 7/2009 | Heber et al. |
| 7,615,890 | B2 | 11/2009 | Masciarelli et al. |
| 7,638,899 | B2 | 12/2009 | Tracy et al. |
| 7,649,758 | B2 | 1/2010 | Taimela et al. |
| 7,667,351 | B2 | 2/2010 | Marwali et al. |
| 7,701,087 | B2 | 4/2010 | Eckroad et al. |
| 7,825,541 | B2 | 11/2010 | Herbener et al. |
| 7,980,905 | B2 | 7/2011 | Rembach et al. |
| 8,022,572 | B2 | 9/2011 | Vyas et al. |
| 8,035,250 | B2 | 10/2011 | Caudill |
| 8,062,081 | B2 | 11/2011 | Barrett et al. |
| 8,148,846 | B2 | 4/2012 | Masciarelli et al. |
| 8,552,589 | B2 | 10/2013 | Ghosh et al. |
| 8,604,640 | B2 | 12/2013 | Masciarelli et al. |
| 8,786,262 | B2 | 7/2014 | Rajashekara et al. |
| 2004/0084965 | A1 | 5/2004 | Welches et al. |
| 2005/0052085 | A1 | 3/2005 | Chang et al. |
| 2006/0006741 | A1 | 1/2006 | Tassitino, Jr. et al. |
| 2006/0113800 | A1 | 6/2006 | Willisch et al. |
| 2006/0167569 | A1 | 7/2006 | Colombi et al. |
| 2007/0007825 | A1 | 1/2007 | Heber et al. |
| 2007/0063677 | A1 | 3/2007 | Schauder |
| 2009/0009001 | A1 | 1/2009 | Marwali et al. |
| 2009/0009005 | A1 | 1/2009 | Luo et al. |
| 2009/0273192 | A1 | 11/2009 | Guven et al. |
| 2010/0002475 | A1 | 1/2010 | Folts et al. |
| 2010/0096853 | A1 | 4/2010 | Woldmann et al. |
| 2011/0106325 | A1 | 5/2011 | Opina, Jr. et al. |
| 2011/0278932 | A1 | 11/2011 | Navarro et al. |
| 2011/0278934 | A1* | 11/2011 | Ghosh ............... H02J 9/062 307/66 |
| 2011/0309677 | A1 | 12/2011 | Bourgeau |
| 2012/0068541 | A1 | 3/2012 | Anderson |
| 2013/0002014 | A1 | 1/2013 | Moore et al. |
| 2013/0069432 | A1 | 3/2013 | Beg et al. |
| 2013/0069434 | A1 | 3/2013 | Beg et al. |
| 2013/0193760 | A1 | 8/2013 | Colombi et al. |
| 2014/0139016 | A1 | 5/2014 | Lovercheck et al. |

FOREIGN PATENT DOCUMENTS

| | | |
|---|---|---|
| CN | 202889279 U | 4/2013 |
| CN | 103560576 A | 2/2014 |
| DE | 102008024222 A1 | 2/2009 |
| DE | 10 2009 017 244 A1 | 10/2010 |
| EP | 1 006 641 A2 | 6/2000 |
| EP | 1 919 055 A2 | 5/2008 |
| EP | 2 101 392 A2 | 9/2009 |
| EP | 2 587 609 A1 | 5/2013 |
| EP | 2608355 A2 | 6/2013 |
| JP | 2005033890 A | 2/2005 |
| KR | 10-1267513 B1 | 5/2013 |
| WO | 2004/025823 A1 | 3/2004 |
| WO | 2013/123546 A1 | 8/2013 |
| WO | 2013/142561 A1 | 9/2013 |

OTHER PUBLICATIONS

Guerrero et al., "A high-performance DSP-controller for parallel operation of online UPS systems", Nineteenth Annual IEEE Applied Power Electronics Conference and Exposition, vol. 1, pp. 463-469, 2004.

Sato et al., "High Reliability and High Performance Parallel-Connected UPS System with Independent Control", Twenty-Seventh International Telecommunications Conference, pp. 389-394, Sep. 2005.

Mosman, "An Isolated-Parallel UPS System for a Large Data Center", The Magazine of 7×24 Exchange International, NewsLink, pp. 6-8, 2007.

Zhongyi et al., "Distributed Control for UPS Modules in Parallel Operation With RMS Voltage Regulation", IEEE Transactions on Industrial Electronics, vol. 55, No. 8, pp. 2860-2869, Aug. 2008.

European Search Report and Written Opinion issued in connection with corresponding EP Application No. 15155175.1 dated Jun. 23, 2015.

Yan Xing et al., "Novel control for redundant parallel UPSs with instantaneous current sharing", IEEE Xplore Abstract, Apr. 2-4, 2002, 959-963, vol. 3, PCC—Osaka, Japan.

Noworolski Z., "Parallel UPS Control and Configuration", IEEE Xplore Abstract, May 19-21, 1981, 205-209 pages, INTELEC—London, England.

Byun Y.B., et al., "Parallel Operation of Three-Phase UPS Inverters by Wireless Load Sharing Control", Twenty-second International Telecommunications Energy Conference, Sep. 10-14, 2000, IEEE, pp. 526-532.

Iwanski G. and Koczara W., "DFIG—Based Power Generation System With UPS Function for Variable-Speed Applications," IEEE Transactions on Industrial Electronics, vol. 55, Issue 8, Aug. 8, 2008, pp. 3047-3054.

Liu X. et al., "A Hybrid AC/DC Microgrid and Its Coordination Control," IEEE Transactions on Smart Grid, vol. 2, Issue 2, Jun. 2011, pp. 278-286.

Waris T. and Nayar C.V., "Variable speed constant frequency diesel power conversion system using doubly fed induction generator (DFIG)," Power Electronics Specialists Conference, 2008, PESC'2008, IEEE, Jun. 15-19, 2008, pp. 2728-2734.

Yao et al.,"Development of Communicationless Hot-Swap Paralleling for Single-Phase UPS Inverters Based on Adaptive Droop Method," Applied Power Electronics Conference and Exposition, Feb. 15, 2009, pp. 1283-1287.

Zhou Y., et al., "Grid-connected and islanded operation of a hybrid power system," Power Engineering Society Conference and Exposition in Africa, 2007, PowerAfrica '07, IEEE, Jul. 16-20, 2007, pp. 1-6.

Extended European Search Report and Opinion issued in connection with related EP Application No. 15157301.1 dated Aug. 14, 2015.

Extended European Search Report and Opinion issued in connection with related EP Application No. 15157305.2 dated Sep. 28, 2015.

Extended European Search Report and Opinion issued in connection with related EP Application No. 16170543.9 dated Oct. 24, 2016.

Extended European Search Report and Opinion issued in connection with related EP Application No. 16172123.8 dated Nov. 4, 2016.

Kolhatkar et al., filed Jun. 17, 2014, U.S. Appl. No. 14/306,641.
Kolhatkar et al., filed Jun. 17, 2014, U.S. Appl. No. 14/306,791.
Tiwari et al., filed May 29, 2015, U.S. Appl. No. 14/725,949.
Tiwari et al., filed Jun. 5, 2015, U.S. Appl. No. 14/732,215.

* cited by examiner

REDUNDANT UNINTERRUPTIBLE POWER SUPPLY SYSTEMS

BACKGROUND

The field of the invention relates generally to uninterruptible power supplies, and more particularly, to implementing uninterruptible power supplies in a ring bus architecture.

Robust power systems enable supplying power to one or more loads. Such power systems may include combinations of generation, transport, rectification, inversion and conversion of power to supply energy for electronic, optical, mechanical, and/or nuclear applications and loads. When implementing power systems and architectures, practical considerations include cost, size, reliability, and ease of implementation.

In at least some known power systems, one or more uninterruptible power supplies (UPSs) facilitate supplying power to a load. UPSs facilitate ensuring that power is continuously supplied to one or more critical loads, even when one or more components of a power system fail. Accordingly, UPSs provide a redundant power source. UPSs may be utilized in a number of applications (e.g., utility substations, industrial plants, marine systems, high security systems, hospitals, datacomm and telecomm centers, semiconductor manufacturing sites, nuclear power plants, etc.). Further, UPSs may be utilized in high, medium, or low power applications. For example, UPSs may be used in relatively small power systems (e.g., entertainment or consumer systems) or microsystems (e.g., a chip-based system).

In at least some known power systems, different power sources, such as separate UPSs, may interfere with one another. If the power sources are not synchronized with one another, they may begin to override one another, causing oscillations or other undesirable effects, and impacting power delivered to one or more loads.

BRIEF DESCRIPTION

In one aspect, a system is provided. The system includes a plurality of uninterruptible power supplies (UPSs), a ring bus, at least one load electrically coupled to the plurality of UPSs and the ring bus, and a controller communicatively coupled to the plurality of UPSs. The controller is configured to calculate a phase angle for each UPS of the plurality of UPSs, wherein the phase angle is calculated relative to a common reference angle, and control operation of each UPS based on the respective calculated phase angles.

In another aspect, a controller for controlling a power supply system is provided. The power supply system includes a plurality of uninterruptible power supplies (UPSs), a ring bus, and at least one load electrically coupled to the plurality of UPSs and the ring bus. The controller includes a processor, and a memory device communicatively coupled to the processor, the memory device storing executable instructions configured to cause the processor to calculate a phase angle for each UPS of the plurality of UPSs, wherein the phase angle is calculated relative to a common reference angle, and control operation of each UPS based on the respective calculated phase angles.

In yet another aspect, a method of controlling a power supply system is provided. The power supply system includes a plurality of uninterruptible power supplies (UPSs), a ring bus, and at least one load electrically coupled to the plurality of UPSs and the ring bus. The method includes calculating, using a controller communicatively coupled to the plurality of UPSs, a phase angle for each UPS of the plurality of UPSs, wherein the phase angle is calculated relative to a common reference angle, and controlling operation of each UPS based on the respective calculated phase angles.

DETAILED DESCRIPTION

Exemplary embodiments of an uninterruptible power supply system are described here. A plurality of uninterruptible power supplies arranged in a ring bus configuration and configured to supply power to at least one load. A control device is communicatively coupled to the plurality of uninterruptible power supplies. Using a load sharing algorithm, the control device calculates a phase angle of output voltage for each uninterruptible power supply. The control device controls the uninterruptible power supplies such that each uninterruptible power supply operates at its respective calculated phase angle to supply power to the at least one load. In various embodiments, the load sharing algorithm includes steps for a slow power transfer, a load loss condition, and hot swapping an uninterruptible power supply in or out of the uninterruptible power supply system.

Figure 1:
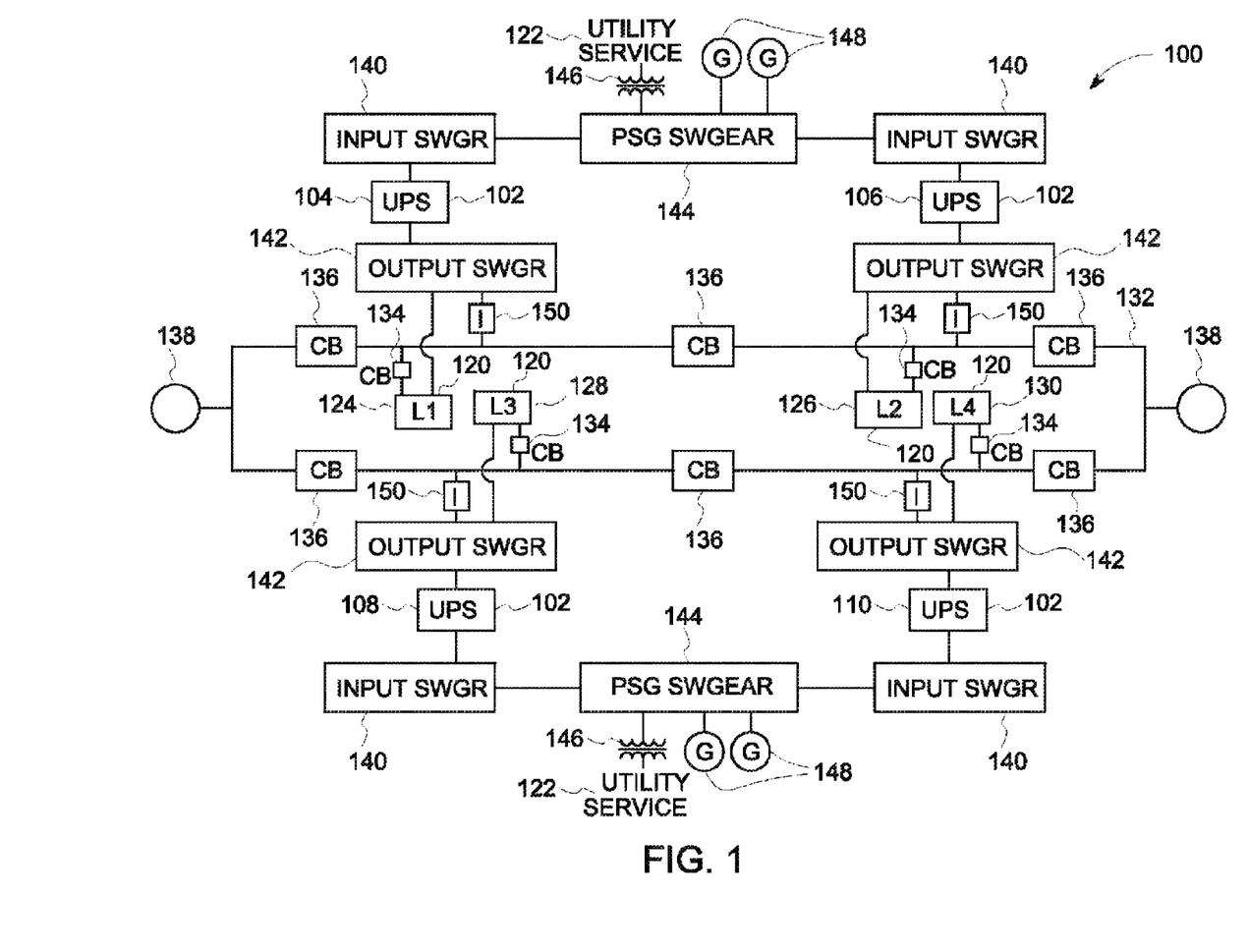
FIG. 1 is a schematic diagram of an exemplary power supply system.

FIG. 1 is a schematic diagram of an exemplary redundant isolated-parallel (IP) uninterruptible power supply (UPS) system 100. In the exemplary embodiment, system 100 includes a plurality of UPSs 102 arranged in a ring architecture, or parallel architecture, as described herein. Specifically, system 100 includes a first UPS 104, a second UPS 106, a third UPS 108, and a fourth UPS 110 in the exemplary embodiment. Alternatively, system 100 may include any number of UPSs 102 that enable system 100 to function as described herein. In the exemplary embodiment, system 100 is a three wire system. Alternatively, system 100 may be a four wire system (i.e., a system including a neutral wire to each load).

In the exemplary embodiment, UPSs 102 are static double conversion UPSs (i.e., true on-line system systems). Both static and rotary UPSs may require droop control techniques for both voltage and frequency. In some cases, droop control for frequency alone may be sufficient. In some embodiments, droop control techniques are adapted depending on whether a load is linear or non-linear.

System 100 facilitates providing power to one or more loads 120. Under normal operation, one or more utilities 122 function as a power source and provide power to loads 120. Utilities 122 may provide alternating current (AC) or direct current (DC) power to system 100. In the event that power from utilities 122 fails to reach loads 120 (e.g., due to a failure of utility 122 and/or devices between utility 122 and loads 120), system 100 utilizes UPSs 102 to keep power flowing to loads 120, as described herein. In the exemplary embodiment, system 100 includes a first load 124, a second load 126, a third load 128, and a fourth load 130. Alternatively, system 100 may include any number of loads 120 that enable system 100 to function as described herein.

Each load 120 is electrically coupled between an associated UPS 102 and a ring bus 132. Specifically, in the exemplary embodiment, each load 120 is coupled to ring bus 132 via an associated load circuit breaker 134. Further, ring bus 132 includes a plurality of ring bus circuit breakers 136. In the event that any segment of ring bus 132 fails or is shut down, the architecture of system 100 ensures that power is still able to reach loads 120. Notably, the architecture shown in FIG. 1 is merely exemplary. For example, in some embodiments, loads 120 may be coupled directly to ring bus 132 or may be coupled between UPSs 102. Further, system 100 may include additional UPSs 138 coupled directly to ring bus 132.

In the exemplary embodiment, each UPS 102 is electrically coupled between an input switchgear 140 and an output switchgear 142. Input switchgears 140 are electrically coupled to paralleling switchgears 144, which are in turn electrically coupled to utility 122 through an associated transformer 146. In the exemplary embodiment, each paralleling switchgear 144 is also electrically coupled to one or more grounds 148. Switchgears 140, 142, and 144 include may include local circuits, remote synchronization circuits, and/or software to facilitate attenuating disturbances, interference, and/or crosstalk on ring bus 132 to provide clean power to loads 120. In the exemplary embodiment, each output switchgear 142 is electrically coupled directly to an associated load 120, and coupled to ring bus 132 through an associated choke 150 (e.g., an inductor).

In system 100, without proper synchronization, UPSs 102 may interfere with one another and/or start to override one another, causing oscillations or other undesirable effects. Accordingly, in the exemplary embodiment, a controller (not shown in FIG. 1) controls operation UPSs 102. More specifically, the controller controls a phase angle, δ, of an output voltage of each UPS 102, as described herein. The phase angle δ is calculated relative to a common reference angle, θ. This common reference may be taken from different sources. For example, the common reference may be a common utility input voltage from utility 122 or a common IP bus voltage from ring bus 132.

Figure 2:
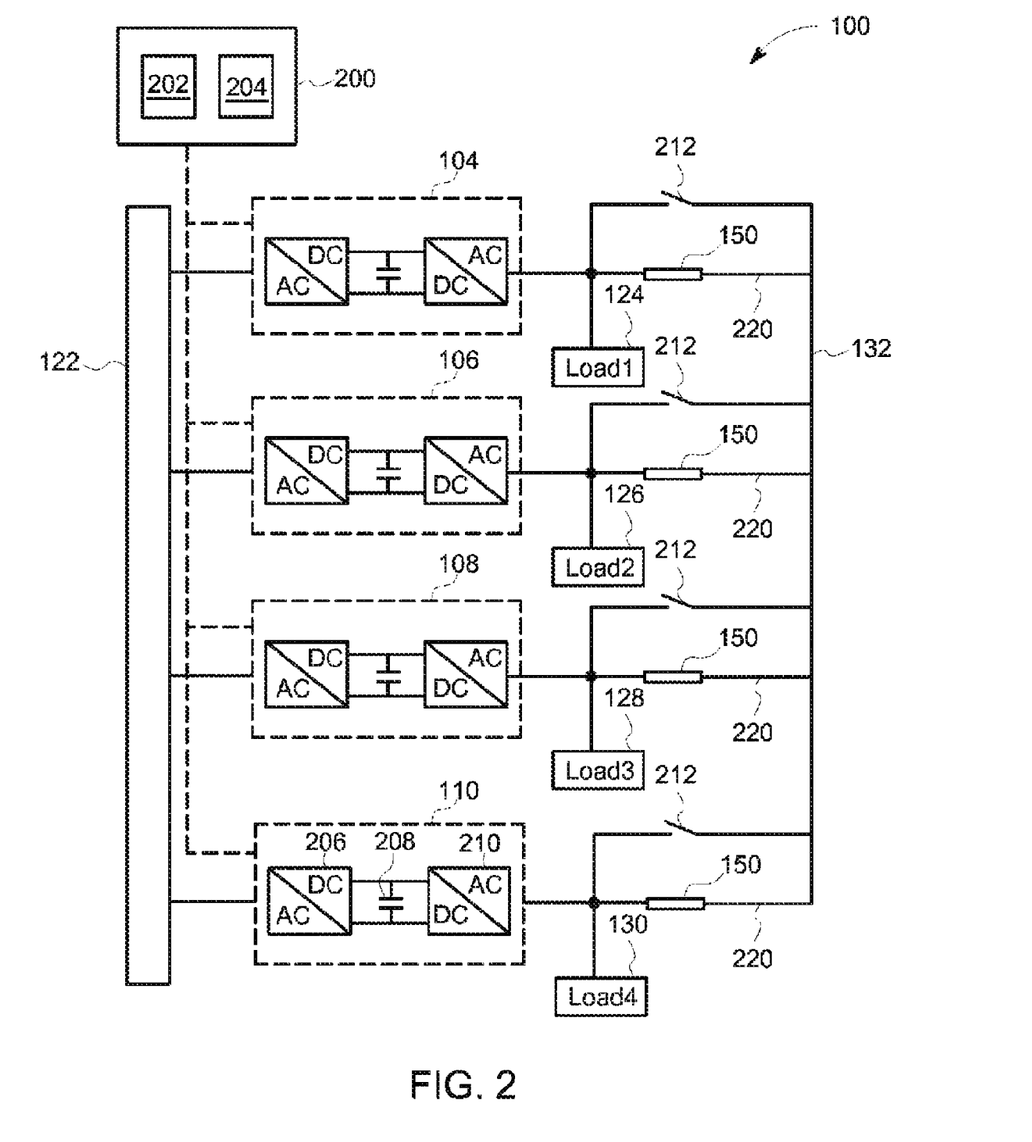
FIG. 2 is a simplified diagram of the system shown in FIG. 1.

FIG. 2 is a simplified diagram of system 100. As shown in FIG. 2, a controller 200 is communicatively coupled to each of first UPS 104, second UPS 106, third UPS 108, and fourth UPS 110. Although a single controller 200 is shown in FIG. 2, alternatively, a separate controller may control the operation of each UPS 102. Controller 200 may include its own power system (not shown) such as a dedicated energy source (e.g., a battery). In some embodiments, controller 200 is coupled to a substitute controller (not shown) that may be used in the event that controller 200 fails. Controller 200 may control power distribution and management of system 100 over a relatively large geographic area.

In the exemplary embodiment, controller 200 is implemented by a processor 202 communicatively coupled to a memory device 204 for executing instructions. In some embodiments, executable instructions are stored in memory device 204. Alternatively, controller 200 may be implemented using any circuitry that enables controller 200 to control operation of UPSs 102 as described herein. For example, in some embodiments, controller 200 may include a state machine that learns or is pre-programmed to determine information relevant to which loads 120 require power. For example, controller 200 may dynamically determine what power resources will be needed and at what performance level and environmental conditions (e.g., temperature, humidity, time of day, etc.) those power resources will need to operate. Controller 200 may perform dynamic monitoring to determine whether a given load 120 is satisfied with the power delivered, and whether delivered power is free of harmonics, transients, etc. In some embodiments, dynamic monitoring may include tracking resource usage to determine how much current or voltage should be delivered. Controller 200 may also monitor and/or control rapidity (i.e., bandwidth) and inverter capability (e.g., overload, reactive power, active power) to facilitate ensuring reliability of system 100 and minimizing performance degradation of UPSs 102.

Controller 200 may also include a state machine scheduler configured to selectively activate and deactivate power resources, set voltage and current levels, and/or take power saving actions (e.g., reducing current delivery). Controller 200 may also track characteristics (e.g., static allocation of power) of system 100 to determine whether one or more components of system 100 should be put on standby or whether power should be diverted.

In the exemplary embodiment, controller 200 performs one or more operations described herein by programming processor 202. For example, processor 202 may be programmed by encoding an operation as one or more executable instructions and by providing the executable instructions in memory device 204. Processor 202 may include one or more processing units (e.g., in a multi-core configuration). Further, processor 202 may be implemented using one or more heterogeneous processor systems in which a main processor is present with secondary processors on a single chip. As another illustrative example, processor 202 may be a symmetric multi-processor system containing multiple processors of the same type. Further, processor 202 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 202 causes controller 200 to operate UPSs 102, as described herein.

In the exemplary embodiment, memory device 204 is one or more devices that enable information such as executable instructions and/or other data to be stored and retrieved. Memory device 204 may include one or more computer readable media, such as, without limitation, dynamic random access memory (DRAM), static random access memory (SRAM), a solid state disk, and/or a hard disk. Memory device 204 may be configured to store, without limitation, application source code, application object code, source code portions of interest, object code portions of interest, configuration data, execution events and/or any other type of data.

As shown in FIG. 2, UPSs 102 and loads 120 are electrically coupled to one another through chokes 150 and ring bus 132. Each UPS 102 includes a rectifier 206, an inverter 208, and a DC capacitor 210 in the exemplary embodiment. Further, each load 120 is electrically coupled in parallel with an output capacitor (not shown), and each UPS 102 is electrically coupled in series with an inductor (not shown), in the exemplary embodiment. Each inductor and an associated output capacitor form an LC filter, and the phase angle δ is a phase angle of the output voltage of a UPS 102 as measured across the output capacitor. Further, a bypass switch 212 is coupled in parallel with each choke 150. Closing bypass switch 212 causes power flow to bypass an associated choke 150. A switch, or contactor, 220 is electrically coupled between each choke 150 and ring bus 132. Contactor 220 can be selectively opened and closed to electrically disconnect and connect an associated UPS 102 from ring bus 132. In FIG. 2, all contactors 220 are closed.

Loads 120 can receive power from a local UPS 102 (e.g., first load 124 receiving power from first UPS 104) and from other UPSs 102 through choke 150. Accordingly, in the event that a local UPS 102 fails, a load 120 can receive power from other UPSs 102.

In the exemplary embodiment, controller 200, and more specifically processor 202, calculates an output voltage phase angle δ for each UPS 102, and controller operates each UPS 102 at the calculated phase angle δ. Specifically, the output voltage of a given UPS 102 can be represented as $\sqrt{2} * V_{nominal} \sin(\omega t + \delta)$, where $V_{nominal}$ is the voltage of UPS 102, ω is the frequency of AC power delivered by UPS 102 (e.g., 2π*60 Hertz), and t is time.

To share power between UPSs 102 through chokes 150, the phase angle δ for each UPS 102 may be calculated using a variety of load sharing algorithms, as described herein. In the exemplary embodiment, the load sharing algorithms are designed to facilitate equal sharing of power by UPSs 102. Further, using the load sharing algorithms described herein, the phase angle δ for each UPS 102 is calculated using only local load information (e.g., the phase angle δ for first UPS 104 is calculated using load information for first load 124).

Although several exemplary load sharing algorithms are described herein, those of skill in the art will appreciate that load sharing algorithms not specifically described herein are within the spirit and scope of the disclosure. In one example, the phase angle δ is retrieved from a look up table (e.g., on memory device 204) of stored values for a given load sharing algorithm. To reduce the amount of stored values while still providing sufficient granularity, memory device 204 may include a read only memory (ROM) circuit having course values (e.g., every 20 degrees) and subdivisions of fine values (e.g., sub-degrees within each 20 degree range).

Figure 3:
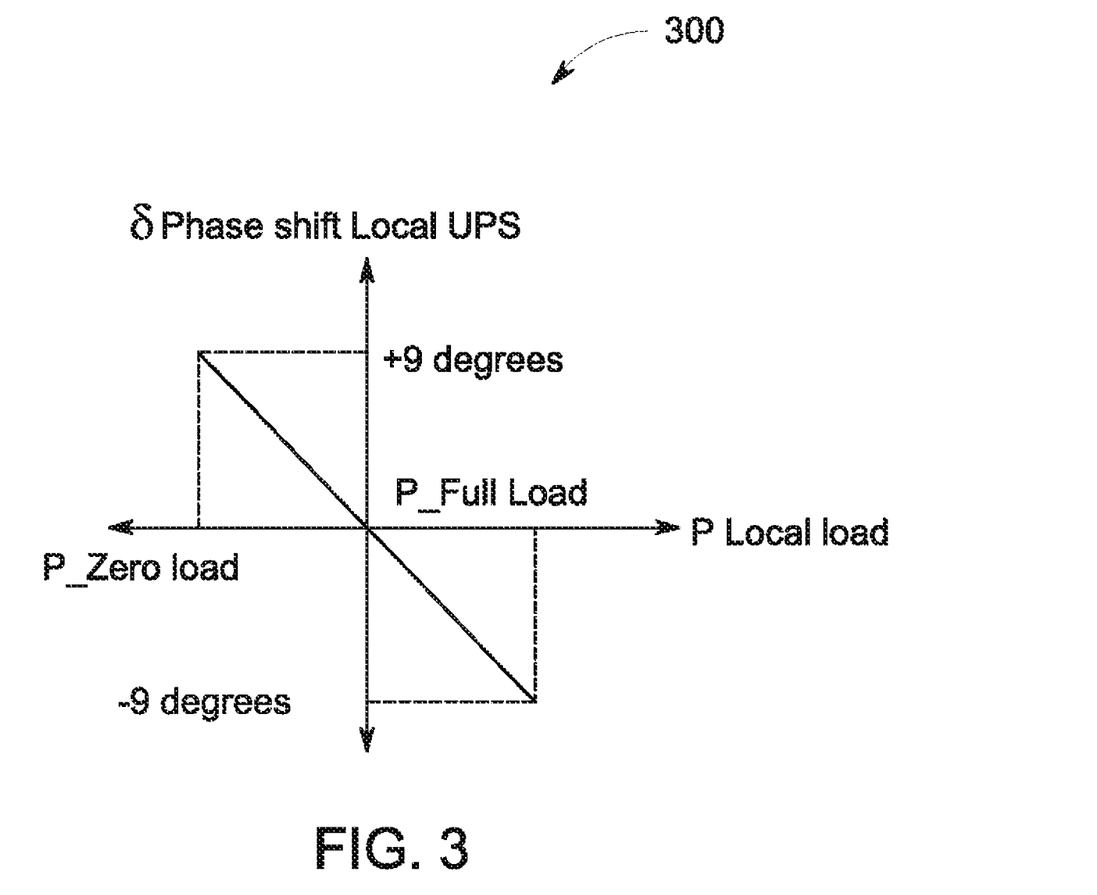
FIG. 3 is a diagram illustrating an exemplary load sharing algorithm that may be used with the system shown in FIGS. 1 and 2.

FIG. 3 is a diagram 300 illustrating one exemplary load sharing algorithm for calculating the phase angle δ. The algorithm may be performed, for example, using controller 200. In the diagram 300 of FIG. 3, for a given UPS 102, the x-axis represents the power to be delivered to the local load 120 associated with UPS 102, and the y-axis is the corresponding phase angle δ for the output voltage of UPS 102. Accordingly, if UPS 102 does not include an associated load 120, it will try to supply a maximum power to ring bus 132, and in doing so, control the phase angle δ to be +9°.

The direction and magnitude of power from a given UPS 102 to ring bus 132 is governed by the following Equation 1:

$$P\_UPS = \frac{V_1 V_2}{x} \sin(\delta) \qquad \text{Equation 1}$$

where P_UPS is the power from the given UPS 102 to ring bus 132, $V_1$ is the voltage of the given UPS 102, $V_2$ is the voltage of ring bus 132, δ is the phase angle between $V_1$ and $V_2$, and x is an effective inductive impedance of the choke 150 associated with the given UPS 102. This equation applies to three-phase systems as well.

Accordingly, in the embodiment shown in FIG. 3, the phase angle δ varies linearly with P_Local_Load (i.e., ω, L, and V are substantially constant. Further, in this embodiment, δ is limited to plus or minus 9°. That is, δ for a given UPS 102 can not be set greater than +9° or less than −9° in the exemplary embodiment. This facilitates high resolution and sensitivity of inverter control, while avoiding relatively large phase angle variations when load 120 is bypassed to ring bus 132. Alternatively, δ may be limited to other values (e.g., plus or minus 10°) that enable system 100 to function as described herein. The phase angle δ values obtained using diagram 300 may be stored in a look up table, for example, on memory device 204.

In an alternative exemplary embodiment, the phase angle δ for each UPS 102 is calculated according to the following Equation 2:

$$\delta = \text{ASIN}\left(\left(\frac{P\_Full\_Load}{2} - P\_Local\_Load\right)\frac{\omega * L}{V^2}\right) \qquad \text{Equation 2}$$

where ω is the frequency of AC power delivered by UPS 102, ω is the inductance of choke 150, P_Local_Load is the power to be delivered to the local load 120 associated with UPS 102, V is the root mean square (RMS) of the AC voltage output by UPS 102, P_Full_Load is the maximum power that can be supplied by UPS 102, and ASIN is the arcsin function. The phase angle δ may be calculated from Equation 2 using, for example, controller 200.

Figure 4:
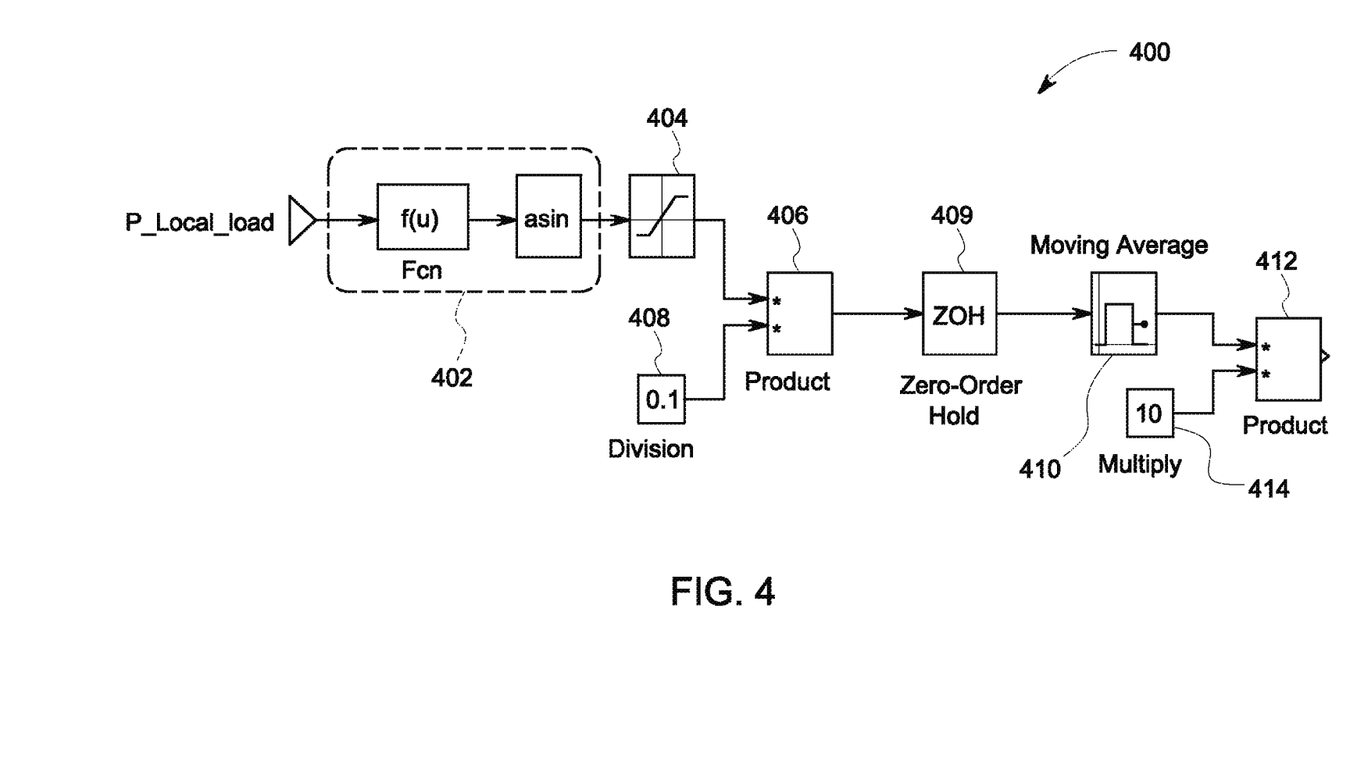
FIG. 4 is a logic diagram of an exemplary load sharing algorithm that may be used with the system shown in FIGS. 1 and 2.

FIG. 4 is a logic diagram of a slow power transfer algorithm 400 that may utilize a look up table based on diagram 300 or Equation 2 to calculate the phase angle δ. Slow power transfer algorithm 400 may be performed, for example, using controller 200. Slow power transfer algorithm 400 facilitates reducing oscillations in system 100. Specifically, if controller 200 merely calculates the phase angles δ and controls UPSs 102 to operate at the calculated phase angles δ substantially instantaneously, UPSs 102 may rapidly change phase angles δ in a relatively short period of time, which may introduce transient oscillations into system 100. Accordingly, slow power transfer algorithm 400 varies the phase angle δ slowly to facilitate a smooth transition to the calculated phase angles δ.

In slow power transfer algorithm 400, P_Local_Load is provided to a phase angle calculation block 402. Using P_Local_Load, phase angle calculation block 402 calculates the phase angle δ (using, e.g., the look up table based on diagram 300 or Equation 2). A limiting block 404 limits the phase angle δ to avoid extreme values. For example, limiting block 404 may limit the phase angle δ to no greater than 9° and no less than −9°.

A first product block 406 multiplies the phase angle δ by a division factor 408. In the exemplary embodiment, division factor 408 is 0.1. Alternatively, division factor 408 may be any value that enables slow power transfer algorithm 400 to function as described herein. A zero-order hold block 409 holds the value from first product block 406 for a predetermined hold time (e.g., 1 millisecond (ms)). A moving average block 410 then calculates a moving average over a predetermined time period (e.g., 10 ms).

A second product block 412 multiplies the value from moving average block 410 by a multiplication factor 414. In the exemplary embodiment, multiplication factor 414 is 10 (i.e., the inverse of division factor 408). Alternatively, multiplication factor 414 may be any value that enables slow power transfer algorithm 400 to function as described herein. The final value generated by second product block 412 is the phase angle δ to which the associated UPS 102 is ultimately set. Accordingly, slow power transfer algorithm 400 gradually transitions UPSs 102 between calculated phase angles δ.

Figure 5:
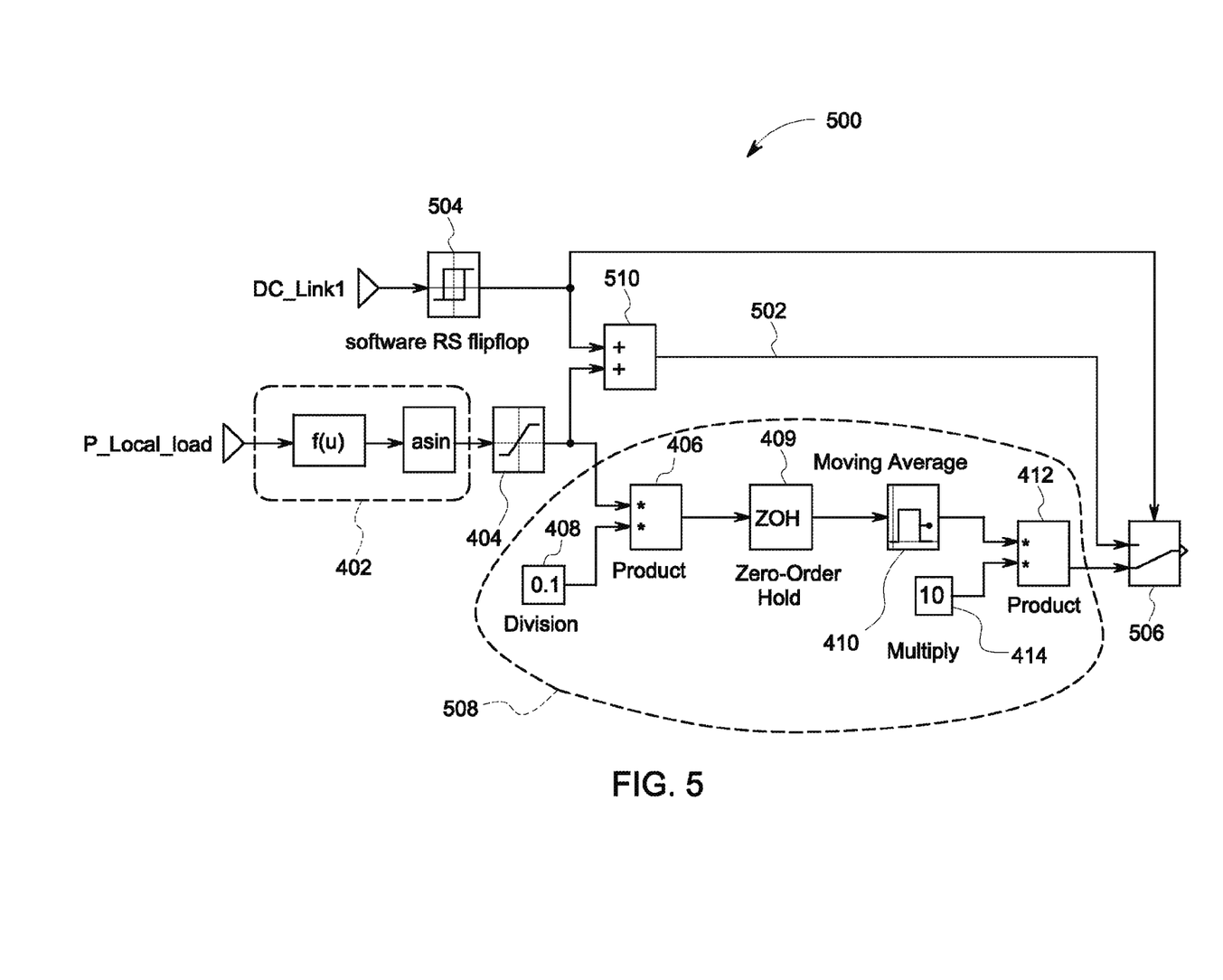
FIG. 5 is a logic diagram of an exemplary load sharing algorithm that may be used with the system shown in FIGS. 1 and 2.

FIG. 5 is a logic diagram of an alternative load sharing algorithm 500 that may utilize a look up table based on diagram 300 or Equation 2 to calculate the phase angle δ. Unless otherwise noted, load sharing algorithm 500 is substantially similar to slow power transfer algorithm 400 (shown in FIG. 4). Load sharing algorithm 500 may be performed, for example, using controller 200 (shown in FIG. 2). Load sharing algorithm 500 accounts for a situation when no load 120 is present for a given UPS 102, and follows a no load logic path 502 when no load 120 is present. For example, a load 120 may suddenly and/or unexpectedly be removed from UPS 102. Accordingly, load sharing algorithm 500 may be referred to as a no load algorithm.

When all or a substantial amount of load 120 is suddenly removed, a DC voltage of a DC input capacitor of an inverter increases. Accordingly, load sharing algorithm 500 provides a value of the DC voltage, DC_Link1, to a software reset-set (SR) flip-flop block 504. If the DC voltage is below a predetermined threshold voltage, flip-flop block 504 is reset at 0°. When flip-flop block 504 outputs 0°, a switch block 506 selects a slow power transfer logic path 508, and the logic proceeds identical to slow transfer power algorithm 400.

If the DC voltage is above the predetermined threshold voltage, flip-flip block 504 is set to 1°. When flip-flop block 504 outputs 1°, switch block 506 selects no load logic path 502, and excludes slow power transfer logic path 508. For no load logic path 502, a summing block 510 sums the 1° output of flip-flop block 504 with the output of limiting block 404. The final value generated by summing block 510 is the phase angle δ to which the associated UPS 102 is ultimately set.

Figure 6:
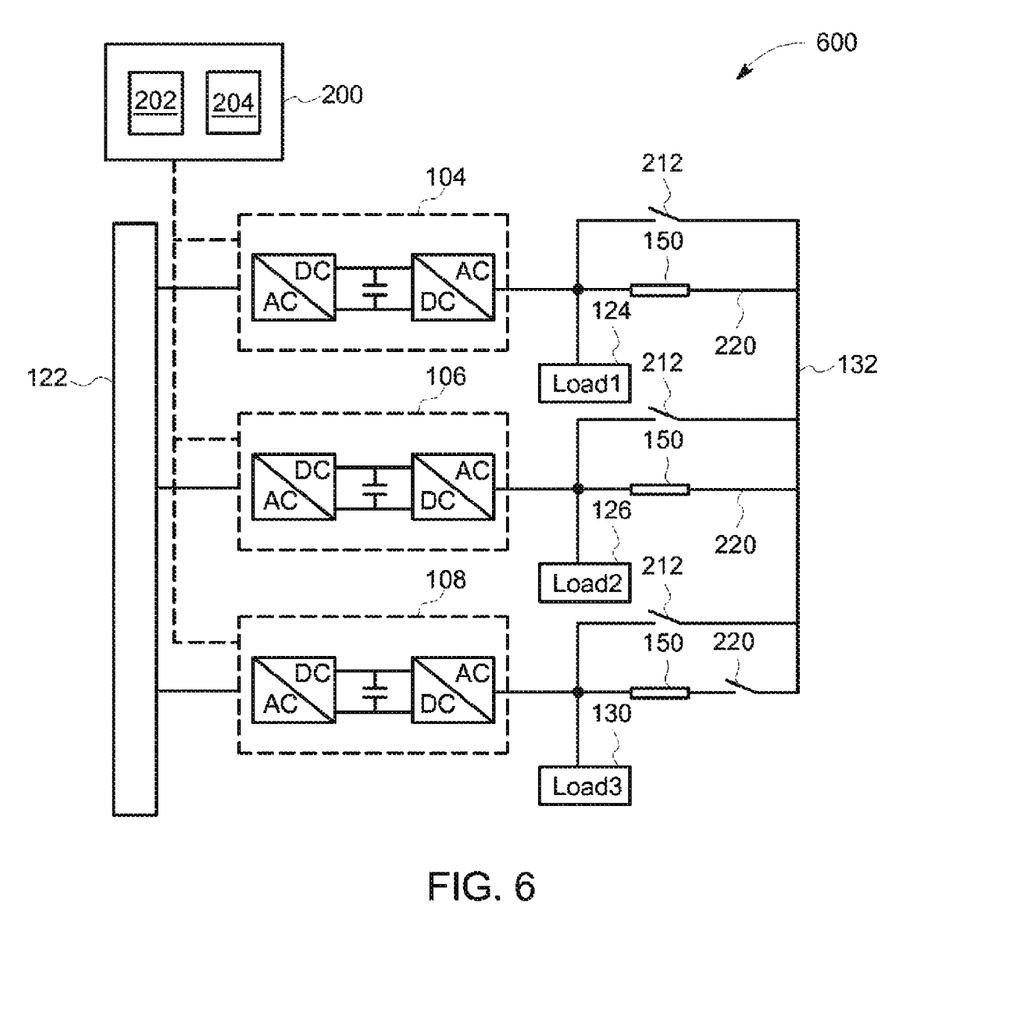
FIG. 6 is a schematic diagram illustrating hot swapping an uninterruptible power supply (UPS) into a power system.

System 100 also facilitates hot swapping one or more UPSs 102 in and/or out of system 100. That is, system 100 facilitates swapping UPSs 102 in and out of system 100 during operation of system 100. FIG. 6 is a schematic diagram of a system 600 that illustrates hot swapping in third UPS 108. That is, system 600 initially includes first UPS 104 and second UPS 106, but not third UPS 108. Unless otherwise noted, system 600 is substantially similar to system 100 (shown in FIGS. 1 and 2).

To swap in third UPS 108, contactor 220 associated with third UPS 108 is closed to electrically couple third UPS 108 to ring bus 132. At the moment that switch is closed, it is desirable that no power flows through the choke 150 associated with third UPS 108. To prevent power flow, the voltage on either side of choke 150 associated with third UPS 108 should be the same in phase and in frequency.

Figure 7:
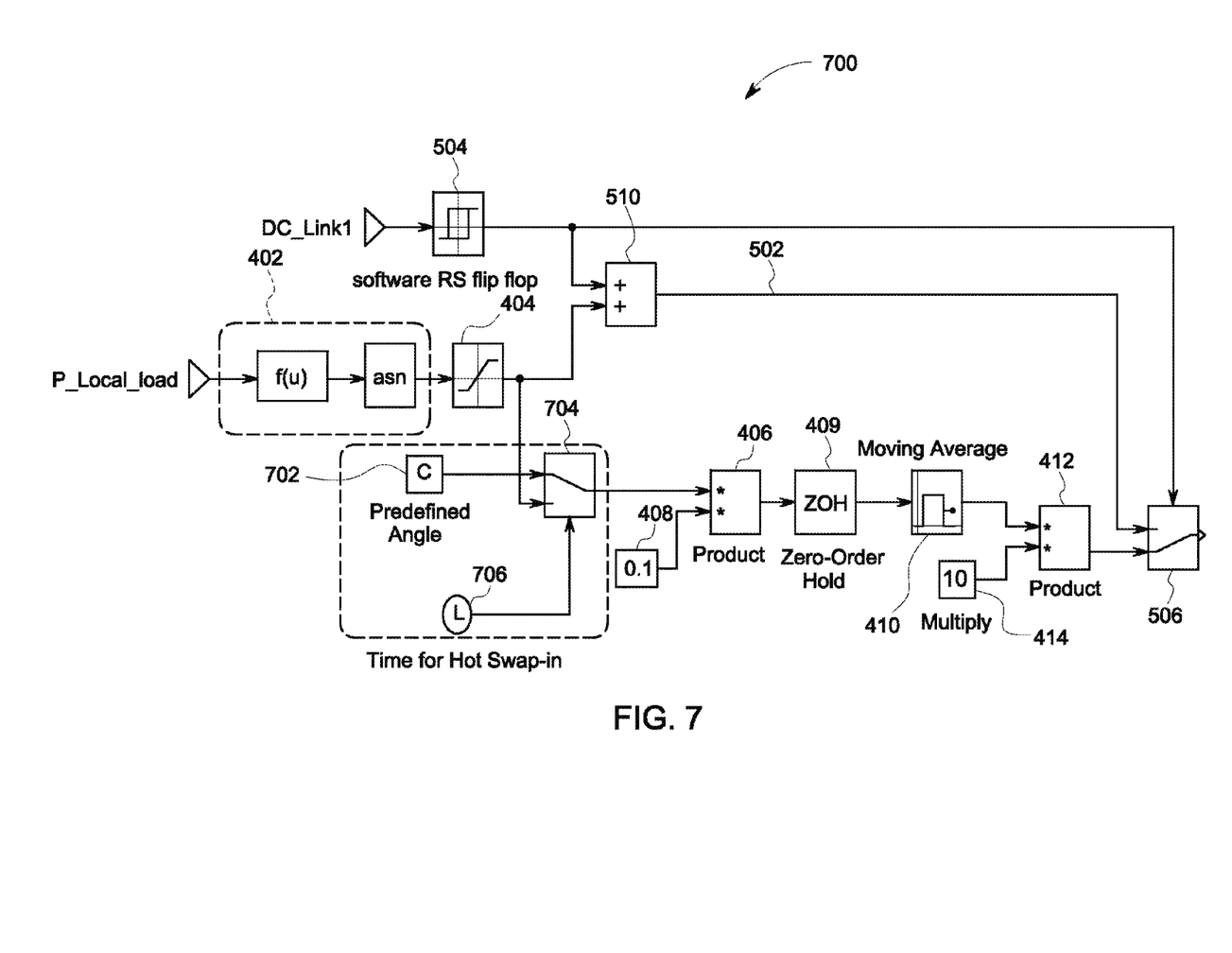
FIG. 7 is a logic diagram of an exemplary load sharing algorithm that may be used when hot swapping a UPS into a power system as shown in FIG. 6.

FIG. 7 is a logic diagram of an alternative load sharing algorithm 700 that may utilize a look up table based on diagram 300 or Equation 2 to calculate the phase angle δ. Unless otherwise noted, load sharing algorithm 700 is substantially similar to load sharing algorithm 500 (shown in FIG. 5). Load sharing algorithm 700 may be performed, for example, using controller 200 (shown in FIG. 2).

Load sharing algorithm 700 facilitates swapping in a UPS, such as third UPS 108. Accordingly, load sharing algorithm 700 may also be referred to as a swapping-in algorithm. Specifically, when a UPS is swapped in, the phase angle δ is not calculated using phase angle calculation block 402. Instead, the phase angle δ is set at a predefined angle for a predetermined period of time. Specifically, when the UPS is swapped in by closing contactor 220, a predefined angle block 702 provides a predefined phase angle, c, to a switch block 704, and first product block 406 takes the predefined phase angle c from switch block 704. In the exemplary embodiment, the predefined phase angle c is set equal to a phase angle of the voltage on ring bus 132. Accordingly, when the UPS is swapped in, there is no voltage across associated choke 150, and no power flows through choke 150.

A timer block 706 controls when switch block 704 switches between supplying predefined phase angle c to first product block 406 and supplying the phase angle δ output by limiting block 404 to first product block 406. Specifically, after a predetermined period of time, switch block 704 switches from supplying predefined phase angle c to first product block 406 to supplying the phase angle δ output by limiting block 404 to first product block 406. Accordingly, after the predetermined period of time expires, the phase angle δ for the swapped-in UPS is calculated using phase angle calculation block 402.

Figure 8:
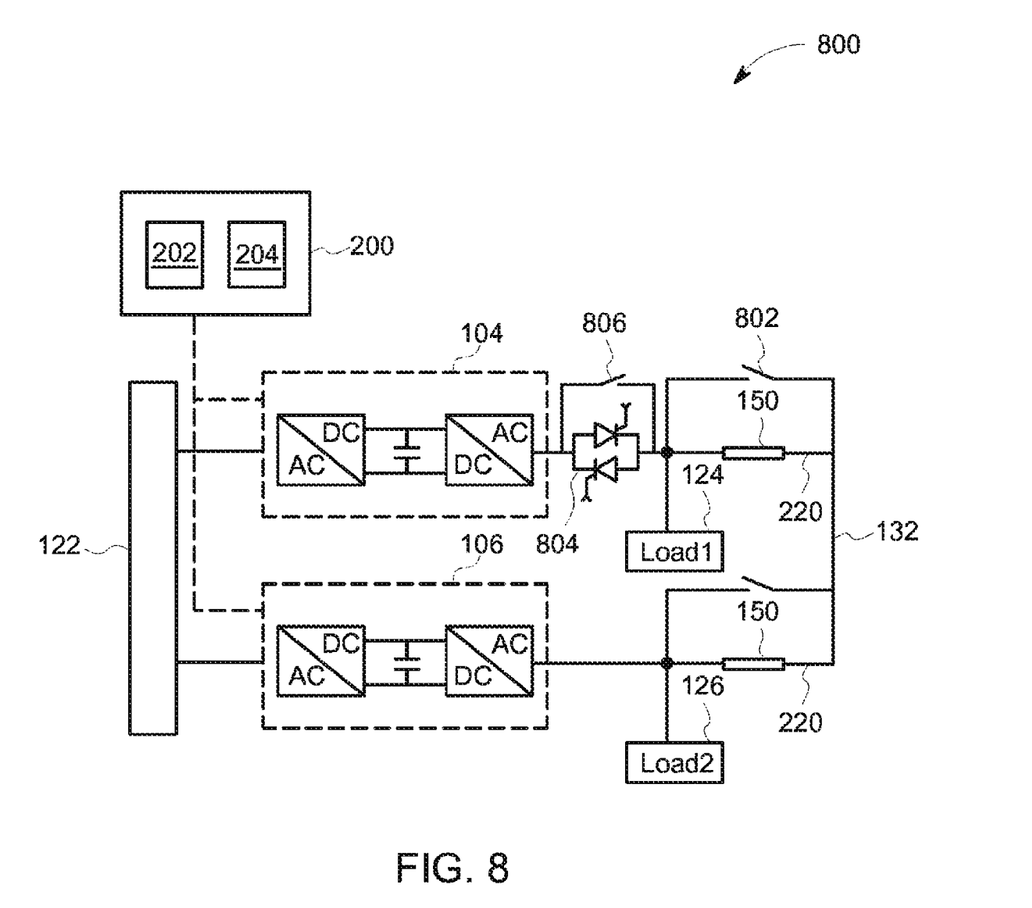
FIG. 8 is a schematic diagram illustrating hot swapping out a UPS from a power system.

FIG. 8 is a schematic diagram of a system 800 that illustrates hot swapping out first UPS 104 in accordance with a swapping-out algorithm. Unless otherwise noted, system 800 is substantially similar to system 100 (shown in FIGS. 1 and 2). System 800 initially includes first UPS 104 and second UPS 106. To facilitate swapping out first UPS 104, system 800 includes a maintenance switch 802 (which is the same as bypass switch 212 (shown in FIG. 2)) electrically coupled in parallel with the choke 150 associated with first UPS 104, a state switch module (SSM) 804 electrically coupled between first UPS 104 and associated choke 150, and a contactor 806 electrically coupled in parallel with SSM 804. In the exemplary embodiment, SSM 804 is a bi-directional thyristor module, capable of flowing current in either direction and capable of switching significantly faster than contactor 806. Alternatively, SSM 804 may be any switching device that enables system 800 to function as described herein.

Before swapping out first UPS 104, maintenance switch 802 is open, SSM 804 is open (i.e., not activated), and contactor 806 is closed. To begin the swapping out procedure, a default load sharing algorithm (such as load sharing algorithm 500 (shown in FIG. 5)) is disabled. With the load sharing algorithm disabled, a phase angle of the voltage on ring bus 132 is measured, and first UPS 104 is made synchronized in phase and frequency with the voltage on ring bus 132. With first UPS 104 operating at the same phase angle and magnitude as the voltage on ring bus 132, no power flows through associated choke 150.

At this point (i.e., without power flowing through associated choke 150), maintenance switch 802 is closed. This connects first load 124 to ring bus 132, bypassing associated choke 150. To remove first UPS 104, the following sequence is performed: (i) SSM 804 is closed (i.e., activated), (ii) contactor 806 is opened, and (iii) SSM 804 is deactivated (i.e., opened). Because SSM 804 is capable of faster switching than contactor 806, utilizing SSM 804 enables disconnecting first UPS 104 from system 800 relatively quickly.

As compared to at least some known power systems, the systems and methods described herein facilitate synchronizing a plurality of UPSs such that the plurality of UPSs do not interfere with or override one another. Using a load sharing algorithm, a control device calculates a phase angle for each UPS. The control device controls the UPSs such that each UPS operates at its respective calculated phase angle to supply power to at least one load. The load sharing algorithm may include steps for a slow power transfer, a load loss condition, and swapping a UPS in or out of the system.

Exemplary embodiments of systems and methods for uninterruptible power supplies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    a plurality of uninterruptible power supplies (UPSs) electrically coupleale to at least one load;
    a ring bus electrically coupleable to the at least one load; and
    a controller communicatively coupled to said plurality of UPSs, said controller configured to:
        calculate a phase angle for each UPS of said plurality of UPSs, wherein the phase angle is calculated relative to a common reference angle; and
        control operation of each UPS based on the respective calculated phase angles by gradually adjusting a phase angle of each UPS using a slow power transfer algorithm to prevent transient oscillations.

2. A system in accordance with claim 1, further comprising a plurality of chokes such that one choke of said plurality of chokes is electrically coupled between each UPS and said ring bus.

3. A system in accordance with claim 1, wherein said controller is further configured to control operation of each UPS in accordance with a swapping-in algorithm that facilitates adding an additional UPS to said system during operation of said system.

4. A system in accordance with claim 1, wherein said controller is further configured to control operation of each UPS in accordance with a swapping-out algorithm that facilitates removing one of said plurality of UPSs from said system during operation of said system.

5. A system in accordance with claim 1, wherein said controller is further configured to control operation of each UPS in accordance with a no load algorithm that facilitates operating said system upon removal of a local load that was previously electrically coupled to one of said plurality of UPSs.

6. A system in accordance with claim 1, where to calculate a phase angle for each UPS, said controller is configured to utilize a look up table that stores values calculated from a two-dimensional relationship between the phase angle and power supplied by a UPS.

7. A system in accordance with claim 1, where to calculate a phase angle for each UPS, said controller is configured to calculate the phase angle using $$\delta = \text{ASIN}\left(\left(\frac{\text{P\_Full\_Load}}{2} - \text{P\_Local\_Load}\right)\frac{\omega * L}{V^2}\right),$$

where $\delta$ is the phase angle, ASIN is the arcsin function, P_Full_Load is a predetermined power that can be supplied by said UPS, P_Local_Load is a power to be delivered to a local load electrically coupled to said UPS, $\omega$ is a frequency of power output by said UPS, L is the inductance of a choke electrically coupled between said UPS and said ring bus, and V is the root mean square of a voltage output by said UPS.

8. A controller for controlling a power supply system that includes a plurality of uninterruptible power supplies (UPSs), a ring bus, and at least one load electrically coupled to the plurality of UPSs and the ring bus, said controller comprising:
    a processor; and
    a memory device communicatively coupled to said processor, said memory device storing executable instructions configured to cause said processor to:
        calculate a phase angle for each UPS of the plurality of UPSs, wherein the phase angle is calculated relative to a common reference angle; and
        control operation of each UPS based on the respective calculated phase angles by gradually adjusting a phase angle of each UPS using a slow power transfer algorithm to prevent transient oscillations.

9. A controller in accordance with claim 8, wherein said executable instructions are configured to further cause said processor to control operation of each UPS in accordance with a swapping-in algorithm that facilitates adding an additional UPS to the power supply system during operation of the power supply system.

10. A controller in accordance with claim 8, wherein said executable instructions are configured to further cause said processor to control operation of each UPS in accordance with a swapping-out algorithm that facilitates removing one of the plurality of UPSs from the power supply system during operation of the power supply system.

11. A controller in accordance with claim 8, wherein said executable instructions are configured to further cause said processor to control operation of each UPS in accordance with a no load algorithm that facilitates operating the power supply system upon removal of a local load that was previously electrically coupled to one of the plurality of UPSs.

12. A controller in accordance with claim 8, wherein to calculate a phase angle for each UPS, said executable instructions are configured to cause said processor to calculate the phase angle using a look up table that stores values calculated from a two-dimensional relationship between the phase angle and power supplied by a UPS.

13. A controller in accordance with claim 8, wherein to calculate a phase angle for each UPS, said executable instructions are configured to cause said processor to calculate the phase angle using $$\delta = \text{ASIN}\left(\left(\frac{\text{P\_Full\_Load}}{2} - \text{P\_Local\_Load}\right)\frac{\omega * L}{V^2}\right),$$

where $\delta$ is the phase angle, ASIN is the arcsin function, P_Full_Load is a predetermined power that can be supplied by the UPS, P_Local_Load is a power to be delivered to a local load electrically coupled to the UPS, $\omega$ is a frequency of power output by the UPS, L is the inductance of a choke electrically coupled between the UPS and the ring bus, and V is the root mean square of a voltage output by the UPS.

14. A controller in accordance with claim 8, wherein to calculate a phase angle for each UPS, said executable instructions are configured to cause said processor to calculate each phase angle such that each phase angle is no greater than 9° and no less than −9°.

15. A method of controlling a power supply system that includes a plurality of uninterruptible power supplies (UPSs), a ring bus, and at least one load electrically coupled to the plurality of UPSs and the ring bus, the method comprising:
  calculating, using a controller communicatively coupled to the plurality of UPSs, a phase angle for each UPS of the plurality of UPSs, wherein the phase angle is calculated relative to a common reference angle; and
  controlling operation of each UPS based on the respective calculated phase angles by gradually adjusting a phase angle of each UPS using a slow power transfer algorithm to prevent transient oscillations.

16. A method in accordance with claim 15, further comprising controlling operation of each UPS in accordance with a swapping-in algorithm that facilitates adding an additional UPS to the power supply system during operation of the power supply system.

17. A method in accordance with claim 15, further comprising controlling operation of each UPS in accordance with a swapping-out algorithm that facilitates removing one of the plurality of UPSs from the power supply system during operation of the power supply system.

* * * * *